United States Patent
Ryu

(10) Patent No.: US 8,593,556 B2
(45) Date of Patent: Nov. 26, 2013

(54) DIGITAL IMAGE SIGNAL PROCESSING APPARATUS FOR DISPLAYING ANGLE OF VIEW INFORMATION, METHOD OF CONTROLLING THE APPARATUS, AND MEDIUM FOR RECORDING THE METHOD

(75) Inventor: Hun-young Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

(21) Appl. No.: 12/820,338

(22) Filed: Jun. 22, 2010

(65) Prior Publication Data

US 2010/0328513 A1   Dec. 30, 2010

(30) Foreign Application Priority Data

Jun. 30, 2009   (KR) .................. 10-2009-0059288

(51) Int. Cl.
*H04N 5/222* (2006.01)
*H04N 5/232* (2006.01)

(52) U.S. Cl.
USPC .............. 348/333.02; 348/211.14; 348/191; 348/14.07

(58) Field of Classification Search
USPC .............. 348/14.07, 211.14, 191, 333.02, 348/333.12, 563, E5.044, E5.105
See application file for complete search history.

(56) References Cited

U.S. PATENT DOCUMENTS

| | | | | |
|---|---|---|---|---|
| 5,594,517 A | * | 1/1997 | Tsunefuji | 396/87 |
| 7,324,151 B2 | * | 1/2008 | Onozawa | 348/346 |
| 7,583,893 B2 | * | 9/2009 | Horii et al. | 396/532 |
| 7,876,373 B2 | * | 1/2011 | Ochi et al. | 348/333.01 |
| 2005/0219405 A1 | * | 10/2005 | Ichihara | 348/370 |
| 2006/0029381 A1 | * | 2/2006 | Onozawa | 396/147 |
| 2010/0208122 A1 | * | 8/2010 | Yumiki | 348/333.08 |

FOREIGN PATENT DOCUMENTS

JP   2002-139788 A   5/2002

* cited by examiner

*Primary Examiner* — Hung Lam
(74) *Attorney, Agent, or Firm* — Drinker Biddle & Reath LLP

(57) ABSTRACT

A digital image signal processing apparatus having an angle of view preview function, a method of controlling the digital image signal processing apparatus, and a recording medium having embodied thereon a computer program for executing the method. Accordingly, a display image displaying at least one piece of angle of view information that is different from angle of view information of a currently mounted interchangeable lens is generated by performing image signal processing, and the display image is displayed. Accordingly, a photographer is informed about angle of view information needed to capture a desired image, and the photographer may easily select an interchangeable lens having desired angle of view information.

16 Claims, 6 Drawing Sheets

DIGITAL IMAGE SIGNAL PROCESSING APPARATUS FOR DISPLAYING ANGLE OF VIEW INFORMATION, METHOD OF CONTROLLING THE APPARATUS, AND MEDIUM FOR RECORDING THE METHOD

CROSS-REFERENCE TO RELATED PATENT APPLICATION

This application claims the benefit of Korean Patent Application No. 10-2009-0059288, filed on Jun. 30, 2009, in the Korean Intellectual Property Office, the disclosure of which is incorporated herein in its entirety by reference.

BACKGROUND

One of more embodiments of the invention relate to a digital image signal processing apparatus capable of selectively detaching a plurality of interchangeable lenses, a method of controlling the apparatus, and a recording medium having embodied thereon a computer program for executing the method.

Recently, digital cameras supplied with a plurality of lenses with various focal lengths corresponding to angle of view information or various zoom magnifications have become widely used. Professional photographers change a number of lenses according to circumstances to obtain high quality pictures of desired scenes. When using a prime lens having a fixed focal length which may ensure good image quality, when the photographer wants to photograph a distant subject after photographing a close subject, the photographer determines a focal length by changing his or her location. However, if a desired focal length is not obtainable with that particular lens, the photographer has to change to another lens. Thus, a focal length of the other lens needs to be checked every time a change of lens is required.

SUMMARY

One or more embodiments of the invention include a digital image signal processing apparatus capable of selectively detaching a plurality of interchangeable lenses, whereby a photographer may easily select an interchangeable lens with which desired images may be obtained.

One or more embodiments of the invention include a method of controlling the apparatus, and a recording medium having embodied thereon a computer program for executing the method.

Additional aspects will be set forth in part in the description which follows and, in part, will be apparent from the description, or may be learned by practice of the presented embodiments.

According to one or more embodiments of the invention, there is provided a method of controlling a digital image signal processing apparatus which is capable of selectively mounting a plurality of interchangeable lenses, the method including: generating an input image that is input through an interchangeable lens having first angle of view information; generating a display image displaying angle of view information that is different from the first angle of view information by performing display image processing on the input image; and displaying the display image.

The display image may have second angle of view information that is greater than the first angle of view information as reduction display image processing is performed with respect to the input image.

If a size of an input image having the first angle of view information is smaller than a size of an image having the second angle of view information, the display image may be generated by synthesizing the image having the second angle of view information with an image that is previously stored in the digital image processing apparatus for an area excluding the image having the second angle of view information.

The image that is previously stored in the digital image processing apparatus for the area excluding the image having the second angle of view information may include a black color image.

The display image may have third angle of view information that is smaller than the first angle of view information as enlargement display image processing is performed to the input image.

The display image may include an image having the first angle of view information and an on-screen display (OSD) representing at least one piece of angle of view information that is different from the first angle of view information.

The display image may include a plurality of display images having a plurality of pieces of angle of view information respectively that are different from the first angle of view information by performing display image processing on the input image, and the display images are displayed together.

According to one or more embodiments of the invention, there is provided a non-transitory computer program product, comprising a computer usable medium having a computer readable program code embodied therein, said computer readable program code adapted to be executed to implement the method.

According to one or more embodiments of the invention, there is provided a digital image signal processing apparatus which is capable of selectively mounting a plurality of interchangeable lenses, including: an interchangeable lens having first angle of view information; an imaging unit that generates an input image that is input through the interchangeable lens; a display image processing unit that generates a display image displaying different angle of view information from the first angle of view information by performing display image processing on the input image; and a display unit that displays the display image.

The display image processing unit may perform reduction display image processing on the input image to generate a display image having second angle of view information that is greater than the first angle of view information.

If a size of the image having the second angle of view information is smaller than a size of the input image having the first angle of view information, the display image processing unit may generate a display image by synthesizing the image having the second angle of view information with an image that is previously stored in the digital image processing apparatus for an area excluding the image having the second angle of view information.

The display image processing unit may generate a display image by coloring the area excluding the image having the second angle of view information black.

The display image processing unit may generate a display image having third angle of view information that is smaller than the first angle of view information by performing enlargement display image processing on the input image.

The display image processing unit may generate a display image including an image having the first angle of view information and an OSD representing at least one piece of angle of view information that is different from the first angle of view information.

The display image processing unit may perform display image processing on the input image to generate a plurality of display images having a plurality of pieces of angle of view information that are different from the first angle of view information, and the display unit may display the display images together.

According to one or more embodiments of the invention, by generating a display image displaying angle of view information that is different from that of a currently mounted interchangeable lens, and displaying the same, the photographer may easily obtain angle of view information that is appropriate for a desired image. Accordingly, the photographer may select an interchangeable lens corresponding to the obtained angle of view information just once.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE EMBODIMENTS

Figure 1:
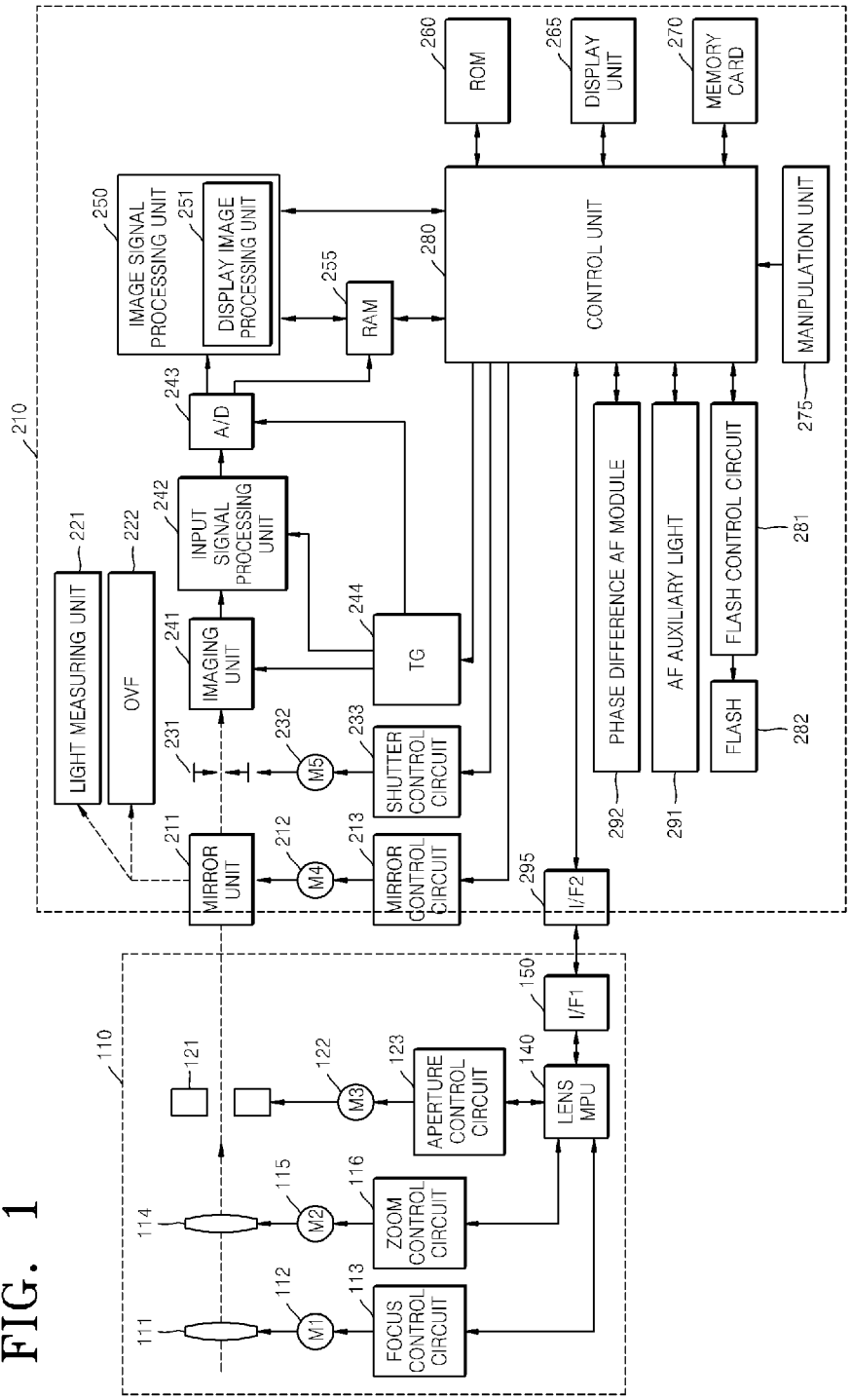
FIG. 1 is a block diagram illustrating a digital image signal processing apparatus, according to an embodiment of the invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

A digital image signal processing apparatus according to an embodiment of the invention and a method of controlling the apparatus will be described in detail with reference to the attached drawings. A digital camera will be described as an example of the digital image signal processing apparatus. In the present specification, the digital camera includes a digital camera that is capable of selectively mounting a plurality of interchangeable lenses. Moreover, the digital image signal processing apparatus may also be a digital device such as a personal digital assistant (PDA) or a mobile phone having the function of the digital camera.

FIG. 1 is a block diagram illustrating a digital image signal processing apparatus according to an embodiment of the invention. Here, a digital camera capable of mounting a plurality of interchangeable lenses is described as an example of the digital image signal processing apparatus.

Referring to FIG. 1, the digital camera includes an interchangeable lens 110 and a body 210 of a digital image signal processing apparatus.

The interchangeable lens 110 includes a focusing lens 111, a zoom lens 114, and an aperture 131. The focusing lens 111 is driven by a focus control circuit 113 and a focusing driving motor M1 112 via a control signal from a lens microprocessor unit (MPU) 140. The focus control circuit 113 may include a focus encoder that outputs an area pattern signal and a pulse signal according to movement of the focusing lens 111. The zoom lens 114 may also be driven by a zoom control circuit 116 and a zoom driving motor M2 115 via a control signal transmitted from the lens MPU 140. If the interchangeable lens 110 is a single lens, the interchangeable lens 110 has a single focal length and thus the zoom driving motor 115 may not be included. The zoom control circuit 116 may include a zoom encoder that outputs an area pattern signal according to movement of the zoom lens 114, in addition to the function of driving the zoom lens 114. After the lens MPU 140 reads a signal from the focus encoder and the zoom encoder, photographing image magnification data, which is recorded by a combination of a subject distance and a focal length, is read, and thus, a photographing image magnification is obtained.

The interchangeable lens 110 may further include a lens group having a correction function, and a control circuit and a driving motor therefor, in addition to the focusing lens 111 and the zoom lens 114. To perform a correction function, an angle speed sensor detecting rotation vibration and an acceleration speed sensor detecting parallel vibration, and a signal processing circuit 1 and a signal processing circuit 2 processing angle vibration signals of the angle speed sensor and the acceleration speed sensor may be included in the interchangeable lens 110. The angle vibration signals on which signal processing is performed are input to the lens MPU 140 to calculate a driving object signal of the correction lens and to control movement of the lens group that performs the correction function based on the driving object signal of the correction lens.

The interchangeable lens 110 includes an aperture 121 that controls an amount of an optical signal (amount of light) that is input through the above-described lenses. In addition, the interchangeable lens 110 includes an aperture driving motor M3 122 that drives the aperture 121, and an aperture control circuit 123 that controls the aperture driving motor 122 via a control signal transmitted from the lens MPU 140.

The lens MPU 140 may be, for example, a micro computer in which a read only memory (ROM) storing a control program or a flash memory storing data related to status information is stored. Each of the elements of the interchangeable lens 110 may be controlled by using the interchangeable lens 110.

Also, the interchangeable lens 110 includes an interface (I/F) 1 150 that performs communication between the body 210 and the lens MPU 140, and the I/F1 150 transmits status information data such as a focal length, an emission pupil position, an aperture value, a focusing distance, or a peripheral light amount, to a control unit 280 of the body 210, and receives data indicating a driving amount of the focusing lens 111. Also, during a photographing operation when an autofocusing (AF) operation has been performed, data such as focal length information, an aperture value, etc., is transmitted to the control unit 280 via the I/F1 150.

The interchangeable lens 110 is detachably coupled to the body 210. The electrical configuration of the body 210 will be described in detail below.

In the body 210, an optical signal is input through the interchangeable lens 110, and a portion of the optical signal is reflected by a mirror unit 211. The reflected portion of the optical signal passes through a five-angle prism to be sensed by a light measuring unit 221, and a light measurement signal transmitted from the light measuring unit 221 is input to the control unit 280, and the control unit 280 may determine a photographing condition such as an exposure time, an aperture number, etc., through the light measurement signal. Also, the reflected portion of the optical signal is formed in a triangular position and may be found as a subject image through an optical view finder (OVF) 222 by the photographer. The OVF 222 may be replaced by an electronic view finder. An imaging unit 241 receives the rest of the optical signal that has passed through the mirror unit 211 and forms an image of the subject. The optical signal that has passed through the mirror unit 211 may be blocked by a shutter 231 or may arrive at the imaging unit 241. The operation of the mirror unit 211 may be controlled by a mirror control unit 212 and a mirror driving unit M4 213 via a control signal transmitted from the control unit 280. Also, the shutter 231 may be driven by a shutter control unit 233 and a shutter driving unit M5 232 via a control signal from the control unit 280. Examples of the imaging unit 241 include a complementary metal oxide semiconductor (CMOS) sensor array, a charge coupled device (CCD) sensor array, or the like.

An input signal processing unit 242 may include a circuit that performs signal processing for adjusting a gain or typifying a waveform of an electrical signal provided from the imaging unit 241. The electrical signal, on which the signal processing is performed, is an analog signal and is converted to a digital signal by an A/D converting unit 243.

A timing generator 244 generates a predetermined timing pulse such as a vertical smayning pulse øVn, a horizontal smayning pulse øVm, a reset signal øVr, etc., based on a basic clock output from the control unit 280 and outputs the timing pulse to the imaging unit 241, thereby controlling an imaging operation of the imaging unit 241. Also, by outputting a predetermined timing pulse to the input signal processing unit 242 or the A/D converting unit 243, the timing generator 244 controls the operation of the signal processing unit 242 and the A/D converting unit 243.

An image signal processing unit 250 includes a display image processing unit 251 that performs display image signal processing for displaying an image on a display unit 265. The display image processing unit 251 may perform luminance level adjustment, color correction, contrast adjustment, outline emphasis adjustment, screen division processing, synthesis of images, etc. Moreover, when performing an angle of view preview function, the image signal processing unit 250 may generate a display image displaying different angle of view information from the angle of view of the interchangeable lens 110. The angle of view preview function will be described later in detail with reference to FIG. 2.

Also, the image signal processing unit 250 may reduce noise with respect to input image data, and may perform image signal processing for improving image quality, such as gamma correction, color filter array interpolation, color matrix, color correction, color enhancement, etc. Also, the image signal processing unit 250 may compress the image data generated by performing image signal processing thereon so as to improve the image quality thereof, thereby generating an image file, or may restore image data from the image file. The compression format of the image data may be a reversible format or an irreversible format. Examples of the appropriate format are a joint photographic experts group (JPEG) format and a JPEG 2000 format. The compressed image file may be stored in a memory card 270. Also, the image signal processing unit 250 may functionally perform coloring, blurring, edge emphasis, image interpretation, image recognition, image effects, etc. In image recognition, face recognition or scene recognition may be performed. The image signal processing unit 250 may perform predetermined image signal processing so as to display image data on an external monitor, and transmit the image data processed in this manner so as to be displayed on the external monitor.

Image data supplied from the A/D converting unit 243 may be transmitted in real-time to the image signal processing unit 250, but if the transmission speed is different from a calculation speed of the image signal processing unit 250, the image data may be temporarily stored in a random access memory (RAM) 255 as a buffer memory, and then supplied to the image signal processing unit 250. Memory devices such as a synchronous dynamic random access memory (SDRAM), multi-chip package (MCP), or a dynamic random access memory (DRAM) may be used as the buffer memory.

A ROM 260 may store an operating system (OS), an application program, etc. which are needed to operate the digital camera. Examples of the ROM 260 include an electrically erasable programmable read only memory (E2PROM), a flash memory, and a ROM.

The image data on which predetermined image signal processing is performed in the image signal processing unit 250 is transmitted to the display unit 265 to be realized as a predetermined image. A display device such as a liquid crystal display (LCD), an organic light emitting display (OLED), a plasma display panel (PDP), or an electronic digital display (EDD) may be used as the display unit 265. Also, the image data may be stored in a memory card 270. However, the current embodiment is not limited to the memory card 270, and various recording media such as a secure digital card/multimedia (SDcard/MM), a hard disk drive (HDD), an optical disk, an optical magnetic disk, a hologram memory, etc., may be used instead of the memory card 270.

A manipulation unit 275 may include elements needed for the photographer to manipulate the digital camera or to set up various photographing conditions. For example, the manipulation unit 275 may include a button, a key, a touch panel, a touch screen, a dial, etc., and user manipulation signals such as a power on/off, a photographing start/stop, a replay start/stop/search, an operation of an optical system, mode conversion, menu manipulation, selection manipulation, etc., may be input through the manipulation unit 275.

The control unit 280 may control each element according to the OS on the application program or control each of the elements according to a manipulation signal of the user that is input through the manipulation unit 275, an input image, image processing result of the image signal processing unit 250, etc.

A flash control circuit 281 controls a flash 282 so as to emit light in a flash photographing mode and the amount of light emitted is set by the control unit 280. The flash 282 is automatically operated by determining exposure information of an input image or is manually operated by manipulation of a user according to necessity. The flash 282 is operated to supply a certain amount of light in the case of insufficient exposure or for a special effect during a photographing operation.

A phase difference AF module 292 performs focus adjustment by using a phase difference detection method, and generates a focusing control signal by using an output signal resulting from focus adjustment processing, and the focusing control signal is transmitted to the interchangeable lens 110 via an I/F2 295 to control movement of the focusing lens 111. Auxiliary light is irradiated from an AF auxiliary light 290 for auto-focusing (AF). According to necessity, the flash 282 or the AF auxiliary light 291 may be operated via the flash circuit 281.

The I/F2 295 includes an interface circuit disposed on the same side as the body 210 for communication between the body 210 and the interchangeable lens 110. The I/F2 295 transmits a focus control signal, and transmits or receives data related to operation status or optical information in the body 210 and the interchangeable lens 110.

Figure 2:
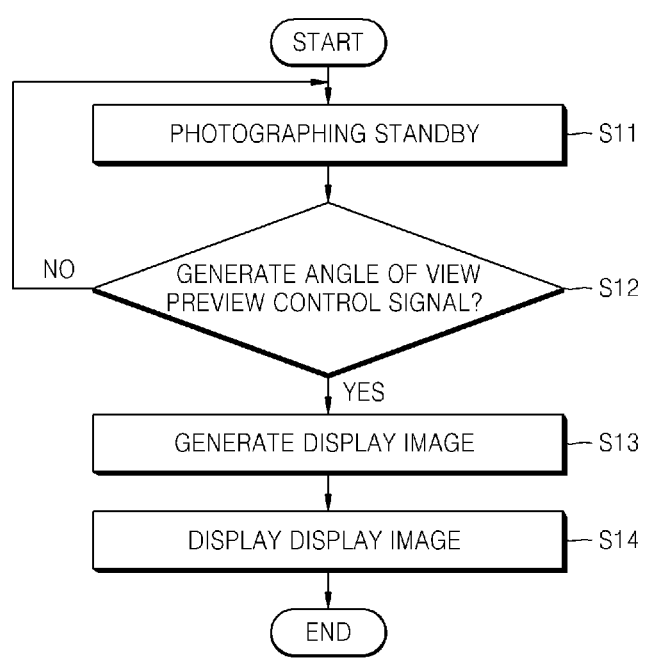
FIG. 2 is a flowchart illustrating a method of controlling a digital image signal processing apparatus, according to an embodiment of the invention.

FIG. 2 is a flowchart illustrating a method of controlling a digital image signal processing apparatus according to an embodiment of the invention.

Referring to FIG. 2, in operation S11, the digital image signal processing apparatus is on standby to perform a photographing operation. Here, a live view image may be displayed in real-time.

Next, in operation S12, whether an angle of view preview control signal is generated is determined. The photographer may generate the angle of view preview control signal by manipulating an element such as a lens detachment button, a depth preview button, or a jog dial. The photographer may generate the angle of view preview control signal not only manually but also automatically in predetermined circumstances.

If the angle of view preview control signal is not generated, the standby state for a photographing operation is further maintained in operation S11.

In operation S13, if the angle of view preview control signal is generated, a display image is formed. At least one piece of angle of view information is displayed on the display image. According to an embodiment, the display image may be generated by performing display image processing on the display image such that the display image has angle of view information that is different from first angle of view information of the interchangeable lens. Alternatively, the display image may be formed by synthesizing on-screen display (OSD) data representing different angle of view information from the first angle of view information with the image having first angle of view information. In operation S14, the display image is displayed to inform the photographer of angle of view information needed to obtain a desired image.

Figure 3:
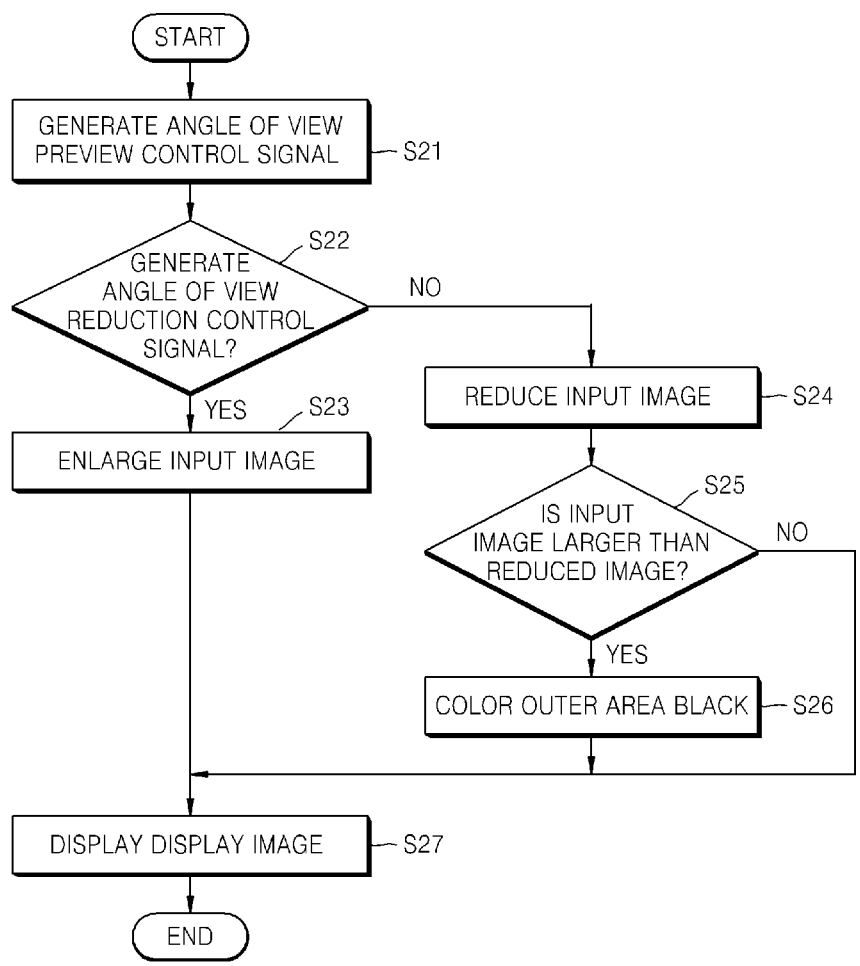
FIG. 3 is a flowchart illustrating a method of controlling a digital image signal processing apparatus, according to another embodiment of the invention.

FIG. 3 is a flowchart illustrating a method of controlling a digital image signal processing apparatus according to another embodiment of the invention.

In detail, an example of generating a display image for an angle of view preview will be described with reference to FIG. 3.

Referring to FIG. 3, if an angle of view preview control signal is generated in operation S21, whether an angle of view reduction control signal is generated is determined in operation S22. If an angle of view reduction control signal is generated, display image processing for enlarging an input image is performed in operation S23.

In operation S24, if an angle of view reduction control signal is not generated, display image processing for reducing an input image is performed. The angle of view reduction control signal may be set as a default when performing the angle of view preview, or an angle of view reduction control signal may be generated manually by the photographer or automatically. Alternatively, an operation of generating an angle of view increase control signal may be included. If an angle of view increase control signal is generated, the input image may be reduced to generate a display image, or if an angle of view increase control signal is not generated, an input image may be enlarged to generate a display image.

When the input image is reduced, the original size of the input image and the size of the reduced input image are compared in operation S25. If the size of the input image is greater than the reduced input image, that is, if the reduced input image is smaller than the input image, an area excluding the reduced input image may be colored black on the display image in operation S26. Alternatively, the area excluding the reduced input image may be synthesized with another image that is stored previously. Accordingly, the reduced image and the outer area of the reduced image may generate a display image that is colored black. If the size of the input image is smaller than the size of the reduced image, the reduced image with respect to the input image may be generated as a display image.

In operation S27, the display image is displayed. The display image may include an OSD that represents corresponding angle of view information.

Figure 4:
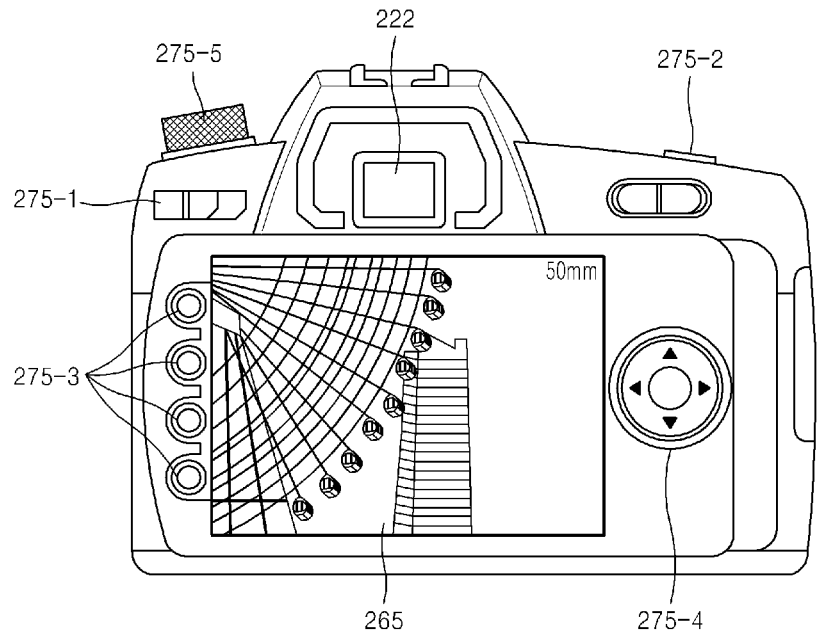
FIGS. 4 through 7 are pictorial images illustrating screen shots of the digital image signal processing apparatus of FIG. 3, according to the method of controlling the digital image signal processing apparatus of FIG. 3.

In detail, if first angle of view information of a current interchangeable lens has a focal length of 50 mm, an input image may be generated as illustrated in FIG. 4.

Figure 5:
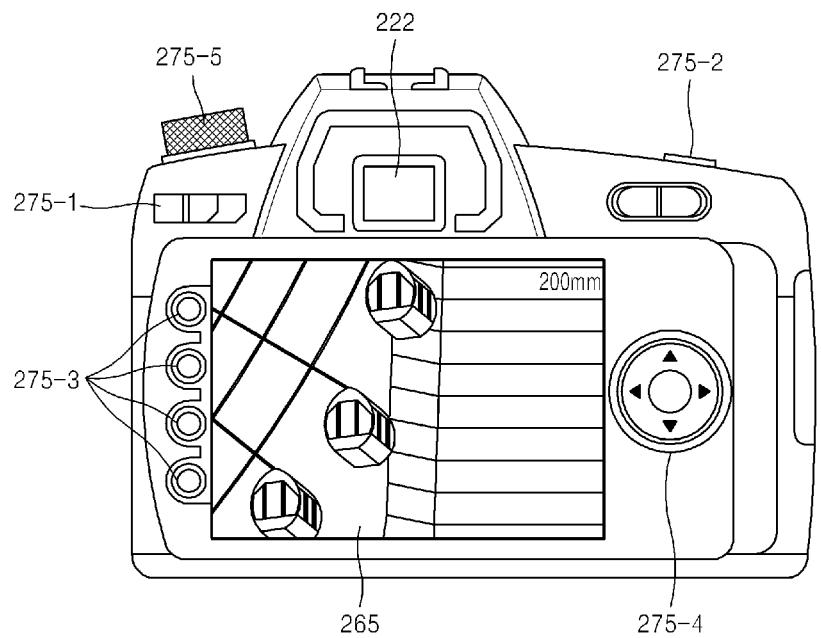
Figure 6:
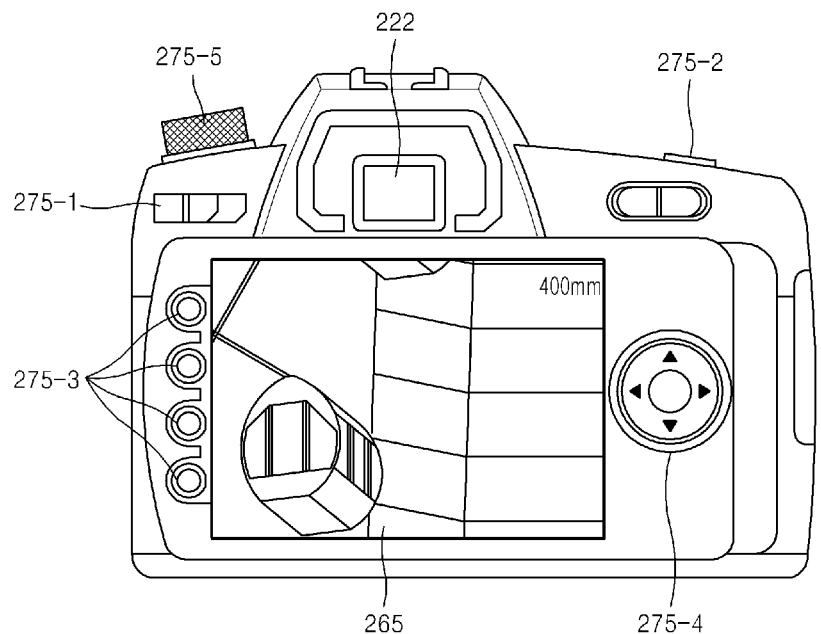

FIGS. 5 and 6 illustrate examples of a display image having second angle of view information that is smaller than the first angle of view information in an angle of view preview mode. Enlargement display image processing may be performed on the input image to generate a display image. FIG. 5 illustrates an image having angle of view information corresponding to a focal length of 200 mm which is smaller than the first angle of view information, and FIG. 6 illustrates an image having angle of view information corresponding to a focal length of 400 mm. The images illustrated in FIGS. 5 and 6 may be obtained by performing display image signal processing on the input images input through the currently mounted interchangeable lens by using an image signal processing unit.

Figure 7:
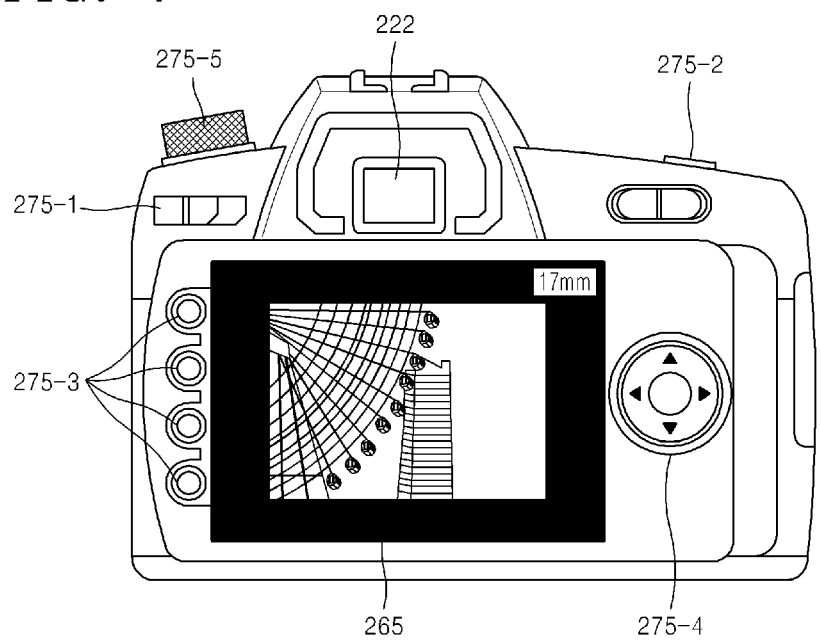

FIG. 7 illustrates an example of a display image having third angle of view information which is greater than the first angle of view information, with respect to the input image. The display image is generated by performing reduction display image processing to the input image. The reduced image may be smaller than the input image. The display image of FIG. 7 has angle of view information having a focal length of 17 mm. If the focal length is short, outer areas of the display image based on the currently mounted interchangeable lens may be colored black for areas in which no actual data received through the current lens is available. That is, an area excluding the reduced image may be colored black. However, this is an example, and the area excluding the reduced image may be synthesized with another previously stored image.

Figure 8:
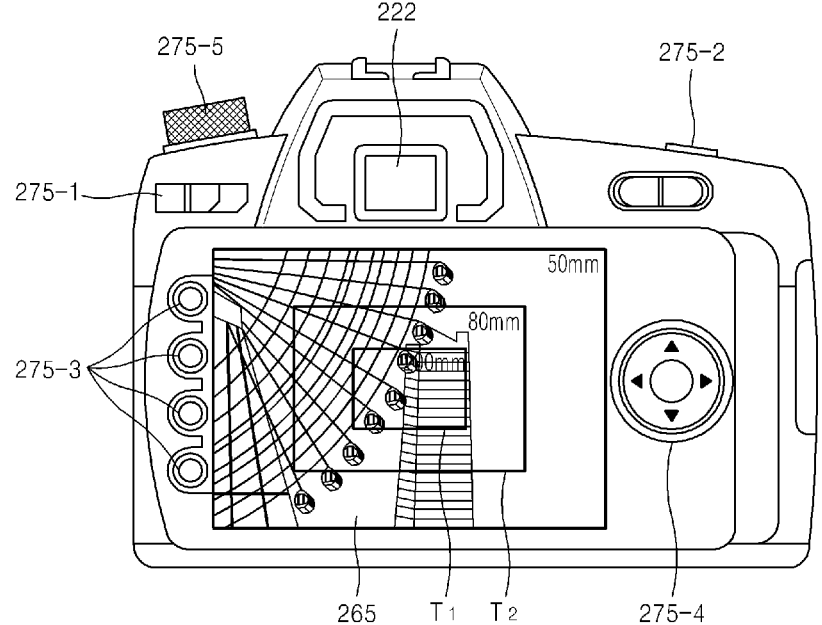
FIG. 8 is a pictorial image illustrating a screen shot of a digital image signal processing apparatus according to a method of controlling the digital image signal processing apparatus, according to another embodiment of the invention.

FIG. 8 illustrates a screen of a digital image signal processing apparatus according to a method of controlling the digital image signal processing apparatus according to another embodiment of the invention. FIG. 8 illustrates another example of a display image having angle of view information that is different from that of a currently mounted interchangeable lens, wherein the angle of view information is displayed by using an OSD.

By performing display image processing with respect to an input image that is input through an interchangeable lens having first angle of view information, an image having the first angle of view information and a display image including the OSD that displays at least one piece of angle of view information that is different from the first angle of view information are generated, and the display image may be displayed. Referring to FIG. 8, an input image that is input through an interchangeable lens having a focal length of 50 mm is synthesized with OSD data displaying focal lengths different from the focal length of 50 mm, and is displayed. In the present embodiment, focal lengths "80 mm" and "200 mm", a black frame T1 corresponding to a range of an image of the focal length of 80 mm, and a black frame T2 corresponding to a range of an image of the focal length of 200 mm are displayed using the OSD. In the present embodiment, the numbers indicating the focal lengths and the black frames displaying the range of the image corresponding to the focal lengths are used as OSDs, but the current embodiment of the invention is not limited thereto, and other various forms of OSD may also be used.

The photographer may reduce the inconvenience of having to check angle of view information every time when changing the interchangeable lens, and because a preview of the angle of view information is provided, the photographer may check angle of view information needed to obtain a desired image and select an interchangeable lens having the angle of view information just once.

FIGS. 4 through 8 illustrate examples of an image that is displayed on a display unit of a digital single lens reflex (DSLR) digital camera. The images are examples of a display image displayed on the display unit 265 on a rear surface of the DSLR digital camera. An optical view finder 222 is disposed on an upper surface or a rear surface of the DSLR digital camera, and various manipulation buttons and dials 275-1, 275-1, 275-2, 275-4, and 275-5 are arranged on the DSLR digital camera.

Figure 9:
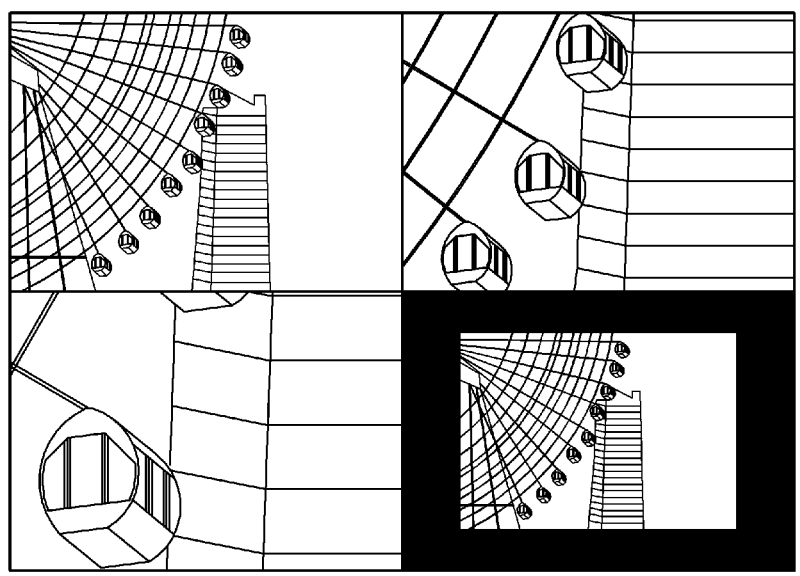
FIG. 9 is a screen shot illustrating a screen of a digital image signal processing apparatus according to a method of controlling the digital image signal processing apparatus, according to another embodiment of the invention.

FIG. 9 illustrates a screen of a digital image signal processing apparatus according to a method of controlling the digital image signal processing apparatus according to another embodiment of the invention. In FIG. 9, a plurality of display images having different angle of view information that is different from the first angle of view information of the interchangeable lens are displayed together. Referring to FIG. 9, the input image of FIG. 4 and the display images of FIGS. 5 through 7 on which display image processing is performed to vary the angle of view information are displayed. Accordingly, the photographer may compare the pieces of the angle of view information at a glance.

The method of controlling the above-described digital image signal processing apparatus according to the embodiments of the invention may be written as computer programs and be implemented in general-use digital computers that execute the computer programs using a computer readable recording medium. Examples of the computer readable recording medium include all kinds of recording devices in which computer readable data is stored.

The embodiments of the preset invention may also be embodied as computer readable code on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion. Also, functional programs, code, and code segments for accomplishing the embodiments of the invention may be easily construed by programmers of ordinary skill in the art to which the embodiments of the preset invention pertains.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a digital image signal processing apparatus which is capable of selectively mounting a plurality of interchangeable lenses, the method comprising:
    (a) automatically generating a first input image that is input through an interchangeable lens of the plurality of interchangeable lenses having first angle of view, wherein the interchangeable lens is currently mounted on the digital image signal processing apparatus;
    (b) generating a display image having a second angle of view of a currently non-mounted interchangeable lens by performing display image processing on the first input image, wherein the second angle of view is different from the first angle of view of the currently mounted interchangeable lens and the currently non-mounted interchangeable lens is different from the currently mounted interchangeable lens; and
    (c) displaying the display image.

2. The method of claim 1, wherein step (b) comprises: performing reduction display image processing to produce the second angle of view that is greater than the first angle of view with respect to the first input image.

3. The method of claim 2, wherein if a size of an image having the second angle of view is smaller than a size of the first input image having the first angle of view, step (b) comprises generating the display image by synthesizing the image having the second angle of view with an image that is previously stored in the digital image processing apparatus for an area excluding the image having the second angle of view.

4. The method of claim 3, wherein the image that is previously stored in the digital image processing apparatus for the area excluding the image having the second angle of view includes a black color image.

5. The method of claim 1, further comprising: performing enlargement display image processing to produce the second angle of view that is smaller than the first angle of view to the first input image.

6. A method of controlling a digital image signal processing apparatus which is capable of selectively mounting a plurality of interchangeable lenses, the method comprising:
    (a) generating a first input image that is input through an interchangeable lens having first angle of view, wherein the interchangeable lens is currently mounted on the digital image processing apparatus;
    (b) generating a display image by synthesizing a first image having the first angle of view and a plurality of images having a plurality of angles of view of at least one currently non-mounted interchangeable lens, wherein the plurality of angles of view is different from the first angle of view and the at least one currently non-mounted interchangeable lens is different from the currently mounted interchangeable lens; and
    (c) displaying the display image.

7. A method of controlling a digital image signal processing apparatus which is capable of selectively mounting a plurality of interchangeable lenses, the method comprising:
    (a) generating a first input image that is input through an interchangeable lens having first angle of view, wherein the interchangeable lens is currently mounted on the digital image processing apparatus;
    (b) generating a plurality of display images by performing display image processing on the first input image, the plurality of display images having a plurality of angles of view of at least one currently non-mounted interchangeable lens, wherein the plurality of angles of view of the at least one currently non-mounted interchangeable lens is different from the first angle of view and the at least one currently non-mounted interchangeable lens is different from the currently mounted interchangeable lens; and
    (c) displaying the plurality of display images together on a screen.

8. A non-transitory computer program product, comprising a computer usable medium having a computer readable program code embodied therein, said computer readable program code adapted to be executed to implement the method of claim 1.

9. A digital image signal processing apparatus which is capable of selectively mounting a plurality of interchangeable lenses, comprising:
    an interchangeable lens of the plurality of interchangeable lenses having first angle of view, wherein the interchangeable lens is currently mounted on the digital image signal processing apparatus;
    an imaging unit that generates a first input image that is input through the currently mounted interchangeable lens;
    a display image processing unit that automatically generates a display image displaying a different angle of view from the first angle of view of the currently mounted interchangeable lens by performing display image processing on the first input image;
    a display unit that displays the display image; and
    a currently non-mounted interchangeable lens having the generated different angle of view, wherein the currently non-mounted interchangeable lens is different from and interchangeable with the currently mounted interchangeable lens.

10. The digital image signal processing apparatus of claim 9, wherein the display image processing unit performs reduction display image processing on the first input image to generate a display image having the different angle of view that is greater than the first angle of view.

11. The digital image signal processing apparatus of claim 10, wherein if a size of the image having the different angle of view is smaller than a size of the first input image having the first angle of view, the display image processing unit generates a display image by synthesizing the image having the different angle of view with an image that is previously stored in the digital image processing apparatus for an area excluding the image having the second angle of view.

12. The digital image signal processing apparatus of claim 11, wherein the display image processing unit generates a display image by coloring the area excluding the image having the end different angle of view black.

13. The digital image signal processing apparatus of claim 9, wherein the display image processing unit generates a display image having the different angle of view that is smaller than the first angle of view by performing enlargement display image processing on the first input image.

14. The digital image signal processing apparatus of claim 9, wherein the display image processing unit generates a display image including an image having the first angle of view and an OSD representing at least one angle of view that is different from the first angle of view.

15. The digital image signal processing apparatus of claim 9, wherein the display image processing unit performs display image processing on the first input image to generate a plurality of display images having a plurality of angles of view that is different from the first angle of view, and the display unit displays the display images together.

16. A method of controlling a digital image signal processing apparatus which is capable of selectively mounting a plurality of interchangeable lenses, the method comprising:
- (a) generating a first input image that is input through an interchangeable lens of the plurality of interchangeable lenses having first angle of view, wherein the interchangeable lens is currently mounted on the digital image signal processing apparatus;
- (b) generating a display image having a second angle of view of a currently non-mounted interchangeable lens by performing display image processing on the first input image, wherein the second angle of view is different from the first angle of view of the currently mounted interchangeable lens and the currently non-mounted interchangeable lens is different from the currently mounted interchangeable lens; and
- (c) displaying the first input image and the display image simultaneously.

* * * * *

UNITED STATES PATENT AND TRADEMARK OFFICE
CERTIFICATE OF CORRECTION

| | |
|---|---|
| PATENT NO. | : 8,593,556 B2 |
| APPLICATION NO. | : 12/820338 |
| DATED | : November 26, 2013 |
| INVENTOR(S) | : Hun-young Ryu |

Page 1 of 1

It is certified that error appears in the above-identified patent and that said Letters Patent is hereby corrected as shown below:

IN THE CLAIMS:

In Claim 1, Column 11, line 8, replace "(a) automatically generating a first input image" with
-- (a) generating a first input image --

In Claim 1, Column 11, line 13, replace "(b) generating a display image" with
-- (b) automatically generating a display image --

In Claim 12, Column 12, line 51, replace "the end different angle of view" with
-- the different angle of view --

Signed and Sealed this
Seventh Day of October, 2014

Michelle K. Lee
*Deputy Director of the United States Patent and Trademark Office*